April 20, 1937. W. R. WILEY 2,077,604

ATTACHING CLIP FOR METAL MOLDINGS

Filed Oct. 28, 1935

William R. Wiley
INVENTOR.

BY Swan Frye and Hardesty
ATTORNEYS.

Patented Apr. 20, 1937

2,077,604

UNITED STATES PATENT OFFICE 2,077,604

ATTACHING CLIP FOR METAL MOLDINGS

William R. Wiley, Detroit, Mich.

Application October 28, 1935, Serial No. 47,015

5 Claims. (Cl. 85—5)

This invention relates to deformable sheet metal clips for attaching an inwardly flanged molding strip to the surface of a supporting sheet metal panel, and has for its object an improved device of this type which is easily and cheaply fabricated in quantities from sheet metal stock, and which lends itself to rapid and effective installation in clinching relation to the parts whose union is desired, the main prerequisite to its satisfactory use being the preliminary perforation of the supporting metal panel with a plurality of suitably aligned holes, which, however, need not be of any exact or regular distance apart, but may be positioned on the panel either relatively far apart or relatively closely together, dependent upon whether there is, for example, a curvature of the panel surface where a relative frequency of anchorage points is desirable.

Figure 1:
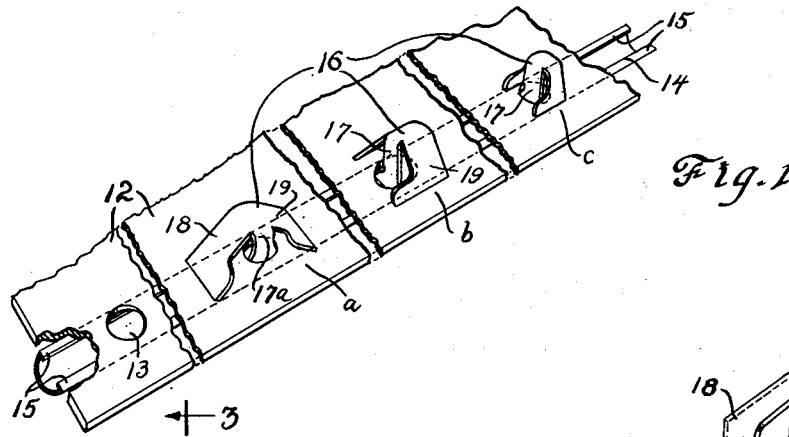
Figure 1 is a perspective of the under or non-exposed side of a sheet metal panel, showing units of my improved construction in the successive stages of application to the parts whose correlation is desired, the molding strip being shown in full lines at either end of the figure, but in dotted lines in the central portion.
Figure 4:
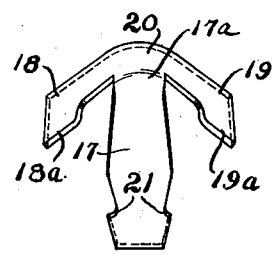
Figure 4 is a perspective of the clip disassociated from the other parts.

12 represents a sheet metal panel provided with holes 13, and 14 represents a sheet metal molding strip provided with inturned flanges 15. It will be noted that the holes 13 preferably have a diameter slightly greater than the space between the opposing edges of the inturned flanges 15 of the molding 14.

Each of the clips 16 may be compared in elevational contour to either an anchor or a raised umbrella, in that the stem 17 is centrally positioned relatively to the sloping branches 18 and 19, which fall away from its top on either side. In the clips as made preparatory to their installation in the several holes 13, the plane of the web 20 which unites the branches 18 and 19 with the stem 17 lies almost if not fully at right angles to the plane of the stem portion 17, and each of the branches 18 and 19 slopes away from the plane of the central web 20 like the sides of an angled house roof. At the base of the stem 17 its mass or web is notched or shouldered, as at 21, and similarly the wings or forward edges of the branches 18 and 19 are broader than their base portions at the points indicated at 18a and 19a.

With the molding strip 14 positioned on the outer face of the panel 12 so that its under side is in suitable registry with the holes 13, the stem portion 17 of the clip is inserted through a hole 13, the diameter of the latter as contrasted with the breadth of the stem 17 below the notched or shouldered portion 21 being such as to permit this insertion, provided the plane of the stem portion 17 of the clip be then positioned lengthwise of the molding strip; in Figure 1 this is designated as position a. The clip is then turned through a 90° angle so that its notched or shouldered portions 21 engage the inner surfaces of the inwardly flanged portions 15 of the molding strip adjacent their opposing edges. The length of the stem 17 relatively to the angularity of the branches 18 and 19 is such that the free or outer edges of the latter ride freely over or somewhat clear of the inner surface of the sheet metal panel, this being the surface seen in perspective Figure 1. The position thus described as attained by the clip is indicated at b in Figure 1.

Figures 2, 3:
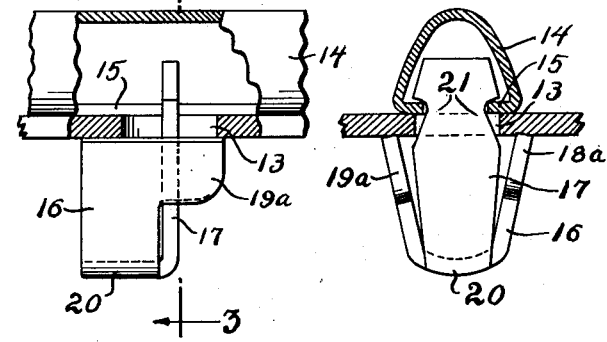
Figure 2 is a large scale lengthwise elevational view, most of it being in section, of a molding strip, the supporting panel and the clip in assembled relation.
Figure 3 is a cross sectional elevational view taken along the line 3—3 of Figure 2 and looking in the direction of the arrows there shown.

By the compressive action of a pair of pliers with which the clip may be handled, the wings or branches 18 and 19 are now forced toward one another, so that their free edges engage with an increasing degree of friction the inside surface of the panel, until they attain almost parallel positions to one another, this being brought out in the portion designated c in Figure 1, and in the lower portion of Figure 3. This action draws upon the stem 17 to such degree as the engagement of its shouldered lower end permits with the flanges 15 of the molding strip, and serves to draw the latter into tight engagement against the outer surface of the panel, that being the remote side of this part, shown in Figure 1, and the upper side of the panel as shown in Figures 2 and 3. And in case various gauges of sheet metal are used for the panel 12 the contouring of the clip at its elbow 17a, that is to say at the point where the stem portion 17 joins the central web 20, the curvatures of the metal web at this point may be of such a radius that if an unusual strain is put upon the stem 17, due to the increased span which it must cover due to the greater thickness of the panel 12, there may be an adequate though actually slight yielding of the edge of the central web 20 about the gentler or longer radiused curve at this point which will afford the added effective length of the stem 17 which may be needed.

Figures 5, 6:
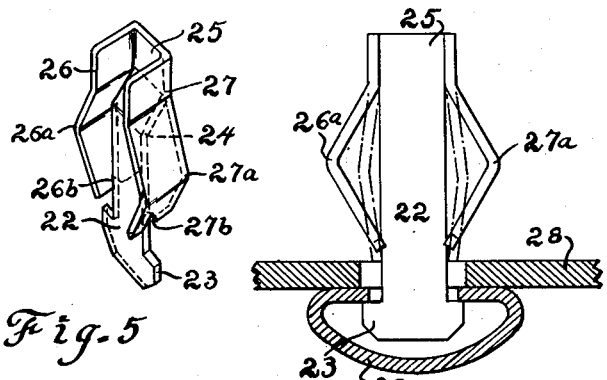
Figure 5 is a perspective of a slightly modified form of clip.
Figure 6 is a partly sectional elevational view of this modified form of clip shown in relation to a molding strip and supporting panel.

In the modified form of clip shown in Figures 5 and 6 the same principle of exerting a drawing action upon the surface of the supporting panel by flexible portions of the clip is followed. In this form, however, the stem portion 22, shouldered as before as at 23, for engagement with the inturned flanges of the molding strip 29, is preferably offset at some intermediate portion of its length as at 24, before reaching the web portion 25 from either side of which the wings 26 and 27 project. The outer portion of the web of each wing or branch is elbowed or bent as at 26a and 27a, and the outer or free end of each is preferably notched as at 26b and 27b in order to facilitate its sliding along the edges of the stem portion 22. This action occurs when the elbowed portions 26a and 27a are pressed toward one another by the compressive action of pliers or equivalent pincing means, and as the angularity of the elbows 26a and 27a is diminished their lower and preferably notched ends are forced into engagement with the surface of the supporting panel member 28, in this case, however, moving directly toward the panel surface instead of by the wiping or swinging movement of the wings or branches 18 or 19 in the form first described. Dependent upon the thickness of the supporting panel 28, the end of the clinching movement may find these initially elbowed or angular branches 26 and 27 still somewhat angular, as indicated in dotted lines in Figure 6, or they may be entirely straightened out and lying against the edges of the stem portion 22 throughout their length. And if slight additional length or stretching of the stem 22 is needed due to an extra thickness of the panel 29, this may result from a slight straightening out of the offset or bent portion 24 under the drawing strain upon the stem 22.

The union of the molding strip and the panel thus effected is a firm and lasting one and, as stated, as frequent an occurrence of the clips along the panel and molding strip as is desired may be had accordingly. When, however, the disassembly of the parts is for any reason desired, this may be easily effected by the insertion of a piercing point or edge under each one of the wings so that the clip is restored to approximately its initial contour, followed by the turning of the clip to a 90° angle and the withdrawal of its stem through the hole in the supporting panel.

What I claim is:

1. A formed sheet metal clip adapted to effect the attachment of a molding strip to the surface of a selectively apertured supporting panel, comprising a stem portion having a notched lower edge portion adapted to be passed through a hole in said supporting panel and between, and beyond the opposing edges of, the inwardly turned flanges of the juxtaposed molding strip and thereafter turned to position of engagement therewith, and an integral head portion having laterally extending branches which are adapted to be bent toward one another, the terminal portions of said branches thereby engaging the adjacent surface of the supporting panel, and in consequence causing an axial pull on the stem portion to draw the inturned flanges of the molding member into tight engagement with the adjacent surface of the supporting panel.

2. An integral sheet metal clip adapted to serve as the correlating medium for a molding strip and a selectively apertured supporting panel, consisting of a stem portion provided with an enlarged lower end adapted to be passed through one of the holes in said panel and between the opposing edges of the underturned flanges of said molding strip and to be thereafter turned about the axis of said stem portion as a center to effect the engagement of its enlarged end portion with the flanged portions of the molding strip, and a head portion provided with laterally projecting wing portions adapted to be bent toward one another with their terminal edges wipingly engaging along the surface of the supporting plate on either side of the hole traversed by the stem of the clip, thereby exerting a draw upon the stem portion of the clip which in turn effects the close positioning of the molding strip against the opposite surface of the supporting panel.

3. A deformable sheet metal clip adapted to effect the positioning of a molding strip on a supporting plate, comprising a stem portion adapted to be passed through a selectively located aperture in the supporting plate and between and into interlocking engagement with the inturned flanges of the molding strip, and a head portion having a pair of laterally projecting branches adapted to be forcibly bent toward one another, thereby wipingly engaging the opposite surface of the supporting plate from that whereon the molding strip is positioned and, through the medium of the strain thus exerted lengthwise of the clip's stem portion, effecting the drawing of the flanged portions of the molding strip into close engagement with the adjacent surface of the supporting plate.

4. Means for effecting a uniformly tight anchorage of all portions of a molding strip to the exposed surface of a supporting panel, comprising a series of individual attaching clips each having a stem portion, adapted to be passed through selectively aligned apertures in the supporting panel and turned into interlocking position of their terminal stem portions with the then flanking inturned flanges of the molding strip, that portion of each clip at the other end thereof from the flange-engaging portion being formed with angularly inclined wings whose terminal edges, in frictional engagement with the opposite surface of the supporting panel from that against which the molding strip is positioned, are adapted to be forced toward one another, by applied compressive action, thereby causing a lengthwise draw upon the flange-engaging stem portion of the clip as the initially inclined wing portions are bent to positions approaching parallelism with one another and with said stem portion.

5. An attaching clip for use in anchoring a molding strip in selected position upon a supporting panel, comprising a stem portion having one shouldered end and integral angularly projecting wing portions at its other end, said shouldered end being adapted to be passed through an aperture in the panel and between the inturned flanges of the molding strip and to be thereafter turned about its lengthwise axis to effect the engagement of its shouldered end with said molding strip flanges, said angularly projecting wing portions whose free end edges then frictionally engage the other surface of the supporting panel from that whereon the molding strip is positioned being then adapted to be forced toward positions of approximate parallelism with one another with their free edges in wiping engagement with the adjacent panel surface throughout the period during which such force is applied and continuingly thereafter, thereby effecting the transmission to the stem portion of the clip of a lengthwise drawing influence which in turn effects the drawing of the molding strip into close engagement with that surface of the supporting panel against which it is positioned.

WILLIAM R. WILEY.